United States Patent
Ferreira Yanez et al.

(10) Patent No.: US 10,173,596 B2
(45) Date of Patent: Jan. 8, 2019

(54) REMOVABLE ARTICLE CARRIER FOR A VEHICLE

(71) Applicant: FORD GLOBAL TECHNOLOGIES, LLC, Dearborn, MI (US)

(72) Inventors: Francisco Javier Ferreira Yanez, Atizapna de Zaragoza (MX); Edgardo Fabricio Ortiz Hernandez, Toluca (MX); Jose Alfredo Peregrina Loera, México City (MX); Carlos Alberto Caballero De Ita, Benito Juarez (MX)

(73) Assignee: Ford Global Technologies, LLC, Dearborn, MI (US)

( * ) Notice: Subject to any disclaimer, the term of this patent is extended or adjusted under 35 U.S.C. 154(b) by 49 days.

(21) Appl. No.: 15/218,633

(22) Filed: Jul. 25, 2016

(65) Prior Publication Data
US 2018/0022280 A1    Jan. 25, 2018

(51) Int. Cl.
| B60R 5/00 | (2006.01) |
| B60R 5/04 | (2006.01) |
| B62B 5/00 | (2006.01) |
| B60R 7/02 | (2006.01) |

(52) U.S. Cl.
CPC ............... B60R 5/04 (2013.01); B60R 7/02 (2013.01); B62B 5/0003 (2013.01)

(58) Field of Classification Search
CPC ............................... B60R 5/04; B62B 5/0003
USPC .................... 224/497, 511, 548, 549
See application file for complete search history.

(56) References Cited

U.S. PATENT DOCUMENTS

| 2,554,776 A | 5/1951 | Comeau |
| 2,594,319 A | 4/1952 | Law |
| 2,795,363 A | 6/1957 | Turner |
| 2,953,287 A | 9/1960 | Werner |
| 3,095,129 A | 6/1963 | Kerr |
| 3,365,084 A | 1/1968 | Fernicola |
| 4,226,348 A | 10/1980 | Dottor et al. |
| 4,538,737 A | 9/1985 | Delaney |

(Continued)

FOREIGN PATENT DOCUMENTS

| DE | 2950766 A1 | 6/1981 |
| EP | 1852308 A1 | 11/2007 |

(Continued)

OTHER PUBLICATIONS

English Machine Translation of WO2008046461A1.

(Continued)

*Primary Examiner* — Peter N Helvey
(74) *Attorney, Agent, or Firm* — Vichit Chea; King & Schickli, PLLC

(57) ABSTRACT

An apparatus for receiving articles in a vehicle cargo area is provided. A collapsible carrier includes at least one locator projection, and a support for supporting the carrier includes a receiver for receiving the locator projection of the carrier to restrict movement of the carrier laterally while allowing the carrier to be separated from the support for removal from the vehicle cargo area. The support may be a platform adapted for raising during movement from a stowed, non-erect position in the vehicle cargo area to an erect, deployed position rearward of the non-erect position to facilitate accessing any articles in the carrier. A related method is also disclosed.

18 Claims, 9 Drawing Sheets

(56) References Cited

U.S. PATENT DOCUMENTS

| | | | |
|---|---|---|---|
| 4,657,295 A | 4/1987 | Holem | |
| 4,799,849 A | 1/1989 | Miller | |
| 4,969,793 A | 11/1990 | Pawl | |
| 5,544,998 A | 8/1996 | Malinowski | |
| 5,713,502 A * | 2/1998 | Dixon | B60R 7/02 190/103 |
| 5,765,987 A | 6/1998 | Zimmermann | |
| 6,007,283 A * | 12/1999 | Labeur | B60R 21/06 410/100 |
| 6,149,040 A * | 11/2000 | Walker | B60R 7/02 224/404 |
| 6,183,177 B1 * | 2/2001 | Dahlgren | B60P 7/0876 410/100 |
| 6,247,741 B1 * | 6/2001 | Seel | B60R 5/00 296/37.14 |
| 6,308,873 B1 | 10/2001 | Baldas et al. | |
| 6,338,518 B1 * | 1/2002 | D'Annunzio | B60R 7/02 296/24.4 |
| 6,375,055 B1 * | 4/2002 | Spykerman | B60R 5/045 108/12 |
| 6,488,168 B1 * | 12/2002 | Wang | B60R 7/02 220/6 |
| 6,516,983 B2 * | 2/2003 | Sotiroff | B60J 5/047 224/281 |
| 6,779,824 B1 * | 8/2004 | Lazarevich | B60P 1/003 296/37.6 |
| 6,890,138 B1 * | 5/2005 | Myrick | B60P 7/0892 410/94 |
| 7,121,601 B2 | 10/2006 | Mulvihill et al. | |
| D539,036 S * | 3/2007 | Potts | D12/425 |
| 7,201,421 B2 * | 4/2007 | Reynolds | B60R 7/02 224/400 |
| 7,392,992 B2 * | 7/2008 | Stone | B62B 1/125 224/411 |
| 7,703,776 B1 | 4/2010 | Nugent | |
| 8,215,693 B2 * | 7/2012 | Ulita | B60R 7/02 296/37.1 |
| 2002/0145022 A1 * | 10/2002 | Nguyen | B60R 7/02 224/539 |
| 2010/0001029 A1 * | 1/2010 | Tai | B60R 5/041 224/499 |
| 2015/0203046 A1 | 7/2015 | Nedelman | |
| 2016/0152189 A1 * | 6/2016 | Nedelman | B60R 7/02 224/539 |

FOREIGN PATENT DOCUMENTS

| | | |
|---|---|---|
| KR | 101591415 B1 | 2/2016 |
| WO | 2008046461 A1 | 4/2008 |

OTHER PUBLICATIONS

English Machine Translation of DE2950766A1.
English Machine Translation of EP1852308A1.
English Machine Translation of KR101591415B1.
Rausch-Technik.com; Ladeboy-Wheelchair Loading System, www.rausch-technik.com/products/wheelchairloadingsystem; Aug. 10, 2016; pp. 2 of 2.

* cited by examiner

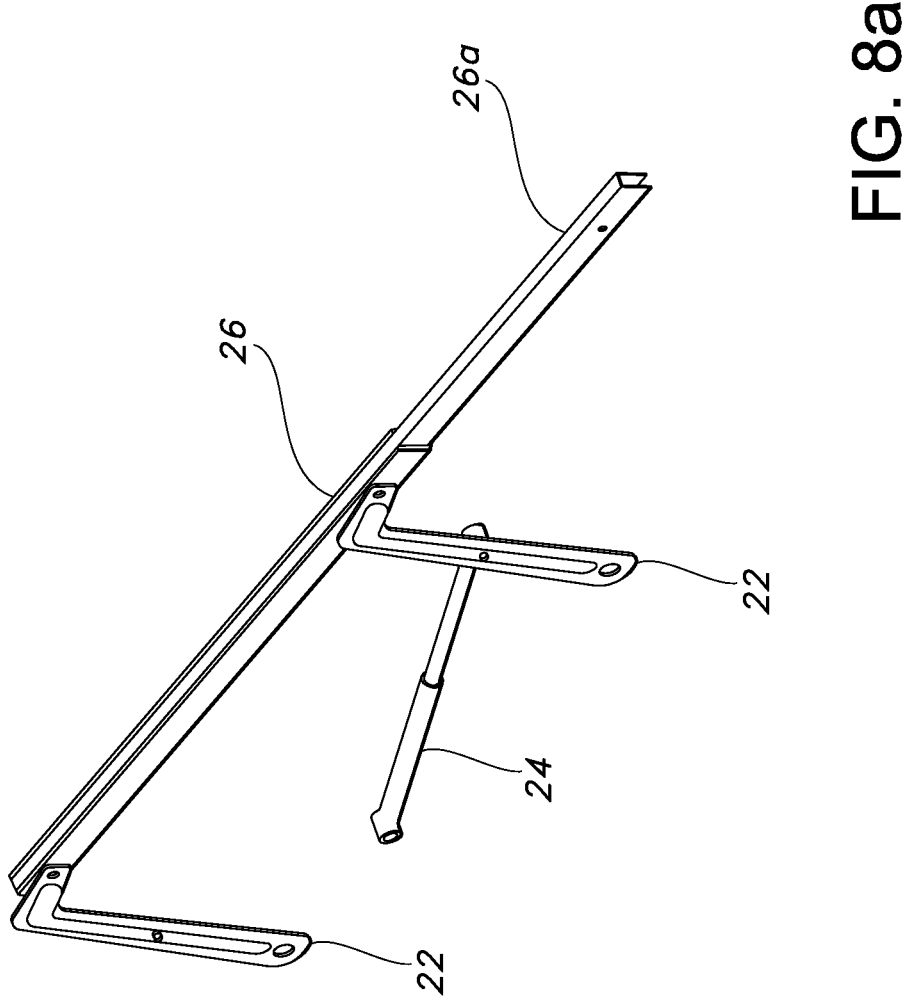

REMOVABLE ARTICLE CARRIER FOR A VEHICLE

TECHNICAL FIELD

This document relates generally to the motor vehicle field and, more particularly, to a removable article carrier for a vehicle.

BACKGROUND

Articles purchased at a store, such as groceries in bags, are typically stored in a vehicle cargo area, such as the trunk, during transport. Most vehicle cargo areas lack a suitable carrier for conveniently holding the articles for transport, especially groceries held in flimsy plastic bags. This allows the articles to escape and move about the cargo area during vehicle travel and lead to problems in terms of collecting the articles for easy removal from the vehicle when the destination is reached.

Past proposals for article carriers for vehicle cargo areas have been made. However, known proposals do not provide for ease of use in terms of allowing the carrier to be removed from the cargo location and returned for compact storage without undue complexity. For these reasons, widespread acceptance has not resulted.

Accordingly, a need is identified for an improved removable article carrier for a vehicle.

SUMMARY

According to one aspect of the disclosure, an apparatus for receiving articles in a vehicle cargo area is provided. The apparatus comprises a carrier including at least one locator projection. A support for supporting the carrier includes a receiver for receiving the locator projection of the carrier. This arrangement is designed to restrict movement of the carrier in a lateral direction and a travel direction of the vehicle, while allowing the carrier to be freely separated from the support for easy removal from the vehicle cargo area, and also to facilitate replacement when laden with articles, such as groceries.

In one embodiment, the carrier comprises a base and at least two collapsible sidewalls supported by the base. One or more flexible barriers may also be provided connecting the at least two sidewalls. Consequently, the carrier may be fully collapsed when not in use for compact storage in the vehicle cargo area.

The support may be a platform adapted for moving from a non-deployed or stowed position in the vehicle cargo area to a deployed position at least partially external to the vehicle cargo area. Specifically, the support platform may be adapted for moving from a non-erect position in the vehicle cargo area to an erect position rearward of the non-erect position. The support platform may comprise legs mounted for pivoting movement relative to the base for supporting the carrier, along with a retainer for retaining the support in the erect position.

The locator projection may comprise a tab depending from the base of the carrier, and the receiver may comprise an opening for receiving the tab. In one embodiment, the carrier includes a plurality of locator projections. The support may include two receivers in the form of elongated slots, each for receiving two of the plurality of locator projections.

According to a further aspect of the disclosure, an apparatus for receiving articles in a vehicle cargo area comprises a collapsible carrier for positioning in the vehicle cargo area for receiving the articles. A support, such as a platform, is also provided for supporting the carrier. The platform is adapted for raising during movement from a non-erect position in the vehicle cargo area to an erect position rearward of the non-erect position to facilitate accessing any articles in the carrier.

In one embodiment, the platform comprises legs mounted for pivoting movement. A retainer may also be provided for retaining the support in the erect position. The carrier may comprise a base and at least two collapsible sidewalls supported by the base. One or more flexible barriers may connect the at least two sidewalls, thus allowing for folding of the carrier in a compact manner when not in use to minimize the amount of space occupied in the vehicle cargo area.

According to another aspect of the disclosure, an apparatus for receiving articles in a vehicle cargo area comprises a collapsible carrier including at least one locator projection. A support platform for supporting the carrier includes a receiver for receiving the locator projection of the carrier to restrict movement of the carrier in a lateral direction and a vehicle travel direction while allowing the carrier to be separated from the support for removal from the vehicle cargo area. The support platform is adapted for raising when moved from a non-erect position in the vehicle cargo area to an erect position rearward of the non-erect position to facilitate accessing articles in the carrier.

A further aspect of the disclosure pertains to a method of carrying articles using the carrier. The method comprises separating the carrier from the support and positioning the carrier in a shopping cart. The method may further comprise locating the locator projection of the carrier in the shopping cart.

In the following description, several embodiments of the removable article carrier for a vehicle are shown and described. As it should be realized, the arrangement is capable of other, different embodiments and its several details are capable of modification in various, obvious aspects all without departing from the removable article carrier for a vehicle as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the disclosed removable article carrier for a vehicle, serve to explain certain principles thereof. In the drawing figures:

FIGS. 4 and 4a are partially cutaway perspective views of a locator arrangement for the article carrier;

FIG. 8a is a perspective view illustrating a support for the carrier including a sliding extension for allowing the carrier to move to and fro in a linear fashion relative to the vehicle cargo area;

Reference will now be made in detail to the present preferred embodiments of the removable article carrier for a vehicle, examples of which are illustrated in the accompanying drawing figures.

DETAILED DESCRIPTION

Figure 2:
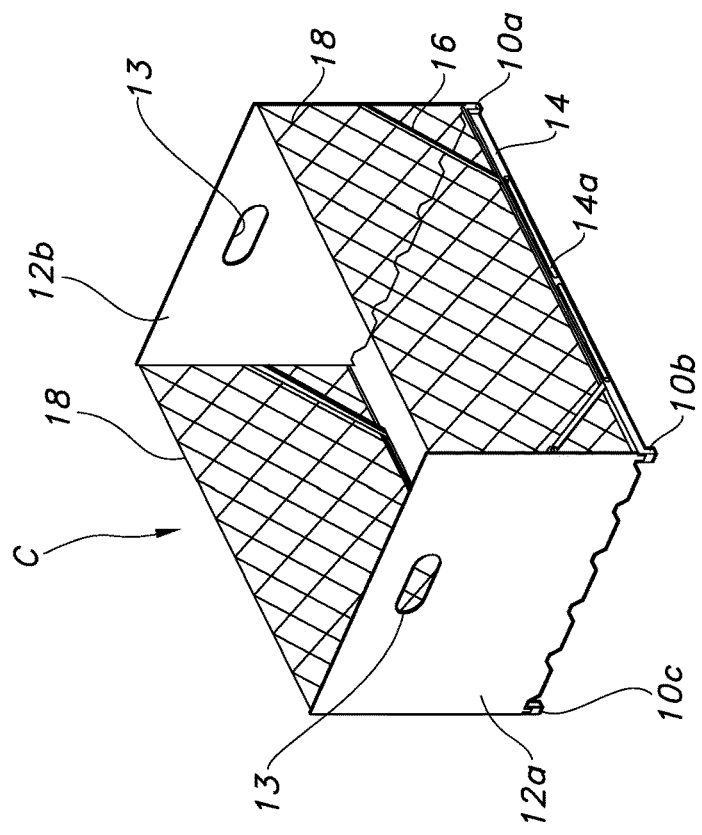
FIG. 2 is a perspective view of the article carrier of FIG. 1 in an erected configuration.
Figure 1:
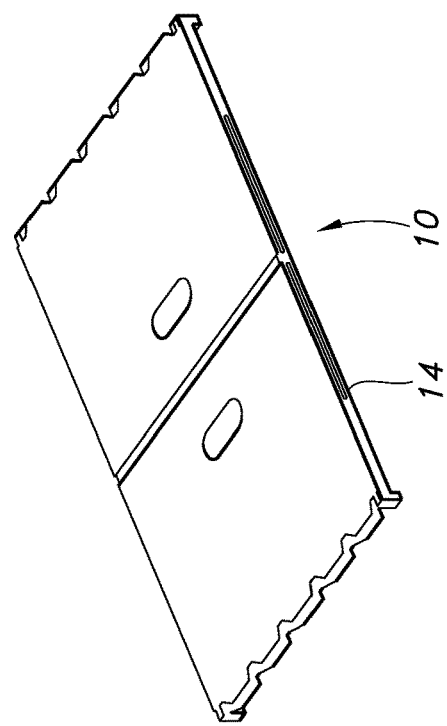
FIG. 1 is a perspective view of an article carrier according to one embodiment in a collapsed configuration.
Figure 3:
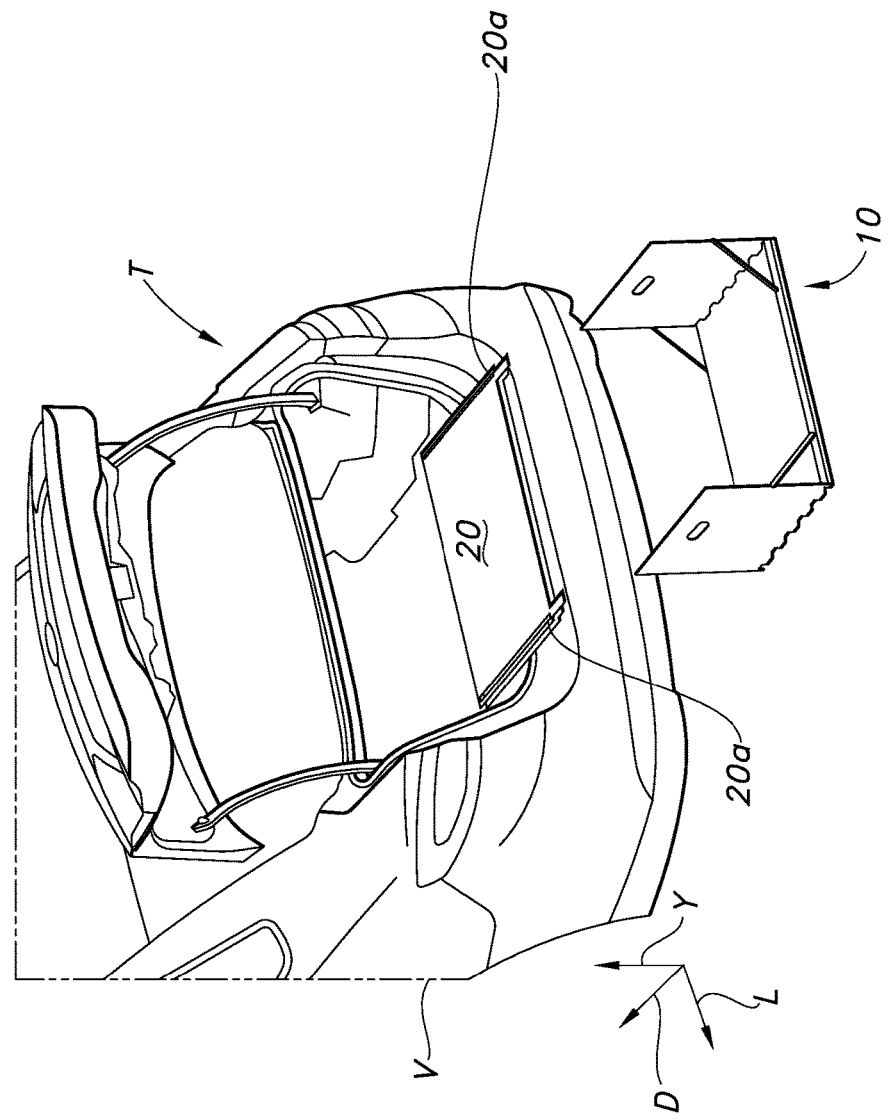
FIG. 3 is a rear, partially cutaway perspective view of the article carrier in combination with a vehicle.

Reference is now made to FIGS. 1, 2 and 3, which illustrate a removable article carrier 10 for a vehicle V, which are shown apart from each other in FIG. 2. The carrier 10 includes plural sidewalls 12 and a base 14 that form a compartment C for receiving and holding articles, such groceries or bags therefore (not shown). The carrier 10 is sized for being positioned in a cargo area of the vehicle V, such as the trunk T.

As can be understood from FIGS. 1 and 2, the carrier 10 may be made collapsible for compact storage when not in use. In the illustrated embodiment, this is achieved by providing sidewalls 12a, 12b along the minor sides of the rectangular base 14 (which could have any desired shape). The sidewalls 12a, 12b may be hingedly connected for collapsing inwardly onto the base 14 to a generally planar configuration, as shown in FIG. 1. The sidewalls 12a, 12b may also be provided with handles, such as in the form of cutouts 13, to facilitate grasping for purposes of performing the erection of the carrier 10. The lateral spacing of the sidewalls 12a, 12b may be such that the handles 13 are located for easy access by a typical adult human for purposes of lifting the carrier 10.

Figure 4:
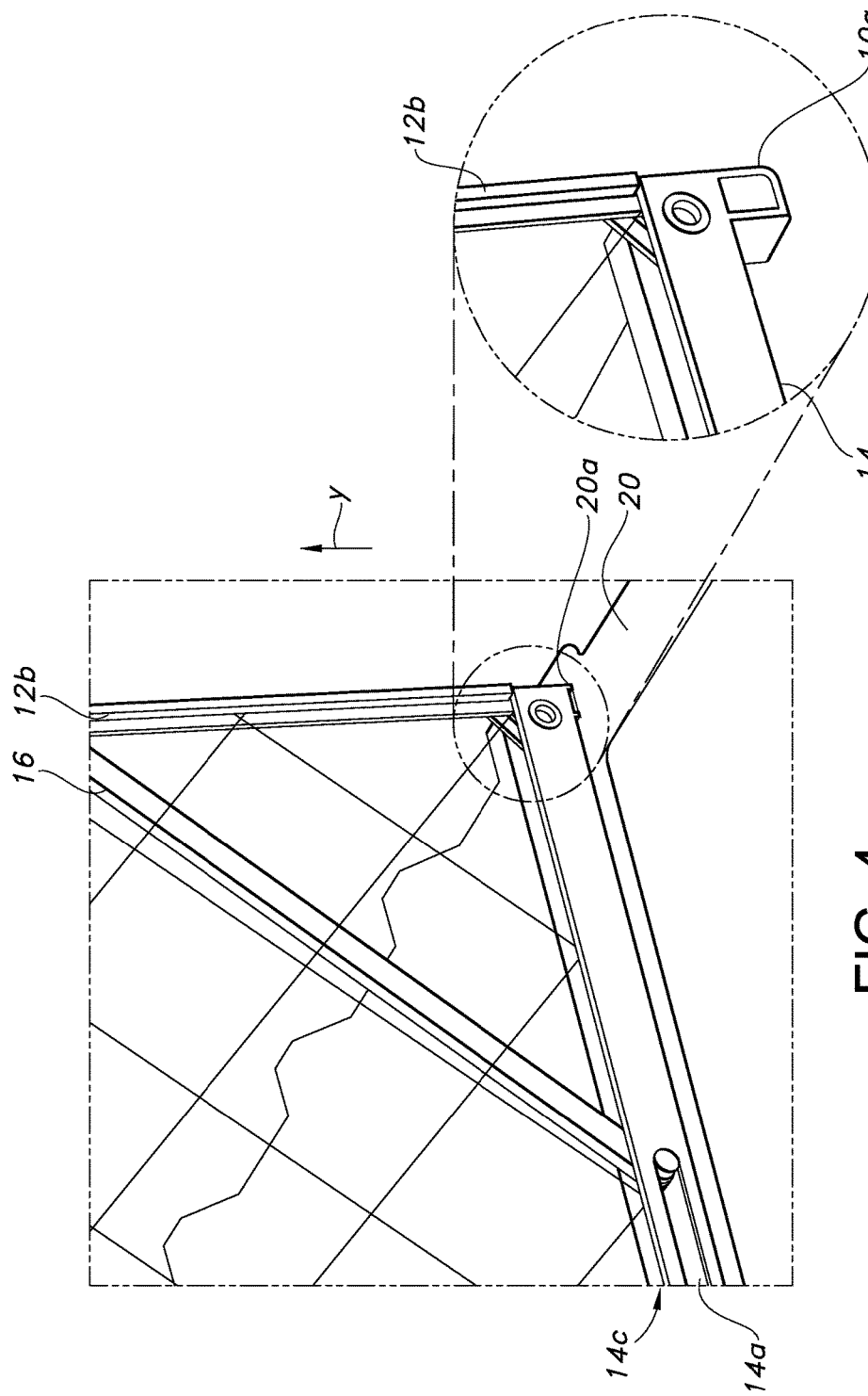

To lend stability and support, connectors in the form of slides 16 may be pivotally connected to the sidewalls 12a, 12b at one end, and received in elongated slots 14a formed in the base 14 at the opposite end, as shown in FIG. 4. As can be appreciated, when the sidewalls 12a, 12b are thus erected, the slides 16 may slide along the slots 14a and pivot to lend support. In the collapsed condition, the slides 16 may also be recessed within a cavity 14c formed in the base 14. A flexible barrier, such as a reticulated member or net 18, may also be provided to connect the sidewalls 12a, 12b along at least one side of the carrier 10, or both the front and rear as shown, and thus complete the compartment C while allowing for the desired collapsibility to be easily achieved.

As can be appreciated from FIG. 3, a support, such as a generally planar platform 20, may be provided for supporting the carrier 10 in the vehicle cargo area, such as trunk T. In the illustrated embodiment, the platform 20 is provided with one or more openings forming receivers 20a. The carrier 10 includes one or more locator projections, which may comprise tabs (see tab 10a in FIG. 4a) that extend from and form part of the periphery of the base 14. The tabs serving as the locator projections are provided adjacent to the four corners of the carrier 10 when in the disclosed rectangular form, and are sized and shaped for passing into the corresponding receiver 20a in the vertical direction Y in a close fitting engagement on at least three sides (for example, in the case of an elongated rectangular slot, the tabs may have square cross sections so as to engage a short edge and opposed long edges of the slot, but a curved or circular arrangement could also be used with success). Thus, relative lateral movement is precluded in the lateral and travel directions, yet the carrier 10 may be freely lifted for purposes of removal from the cargo area.

The receivers 20a in one embodiment may each comprise an elongated slot formed in the platform 20 and extending in the vehicle travel direction D for receiving a pair of tabs 10b, 10c on each side of the carrier 10 (see FIG. 2). Thus, to connect the carrier 10 to the platform 20, the front tabs (only one such tab 10c shown) at the forward end of the carrier 10 may be positioned in the forward ends of the slots forming receivers 20a in the illustrated example. The slots then guide the front tabs of the carrier 10 into the forward position until the rear tabs 10a, 10b drop into the rear end of the slots. Consequently, the locating of the carrier 10 on the platform 20 may be achieved in an easy and efficient manner, yet reliable support against shifting (in both the travel direction D and a lateral direction L) provided by the combined action of the tabs and the slots.

Figure 5:
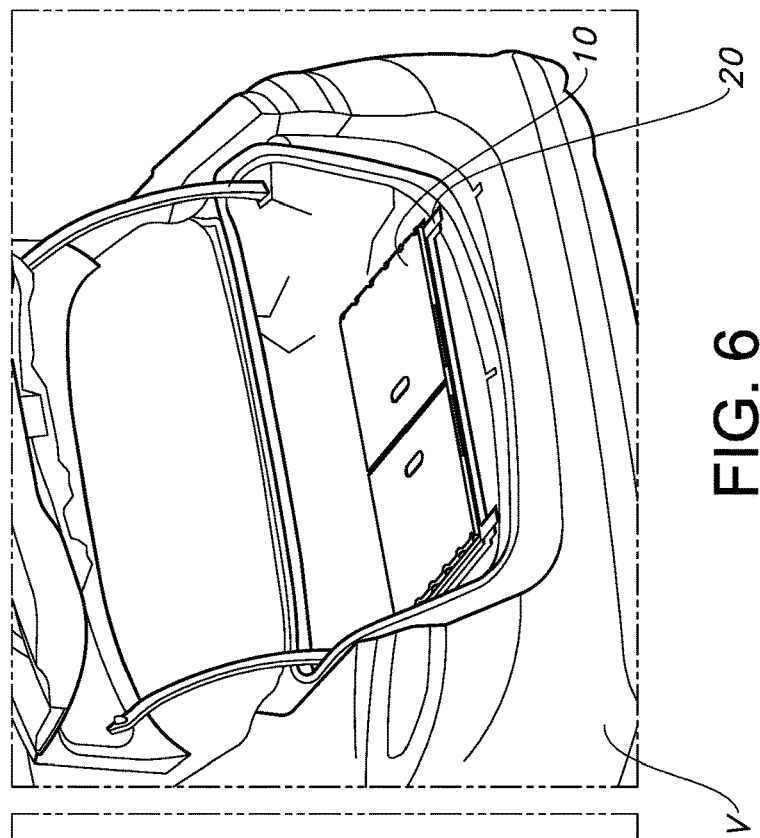
FIG. 5 is a perspective view of the carrier connected to a support in the vehicle cargo area.
Figure 6:
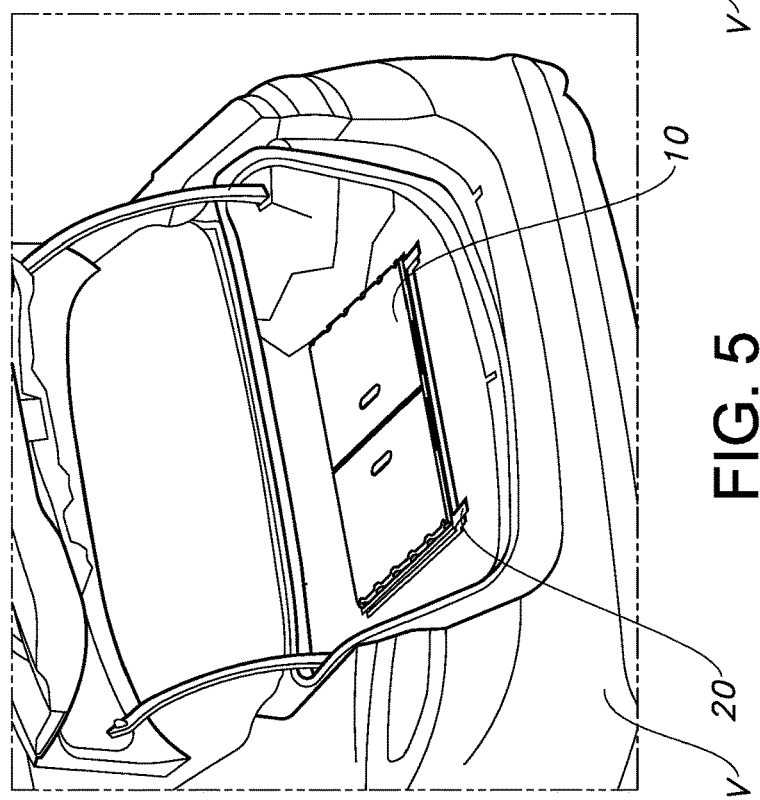
FIG. 6 is a perspective view of the carrier moving toward a position external to the cargo area.
Figure 8:
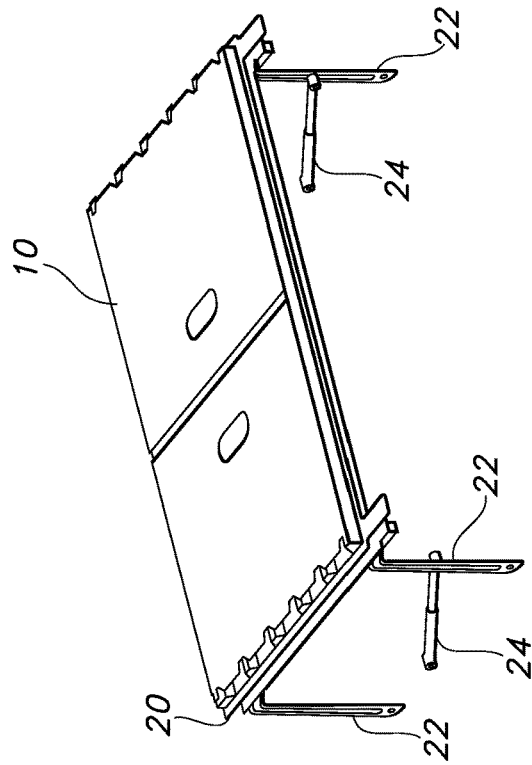
FIGS. 7 and 8 are perspective views illustrating a support for the carrier in a non-erected and an erected condition, respectively.
Figure 7:
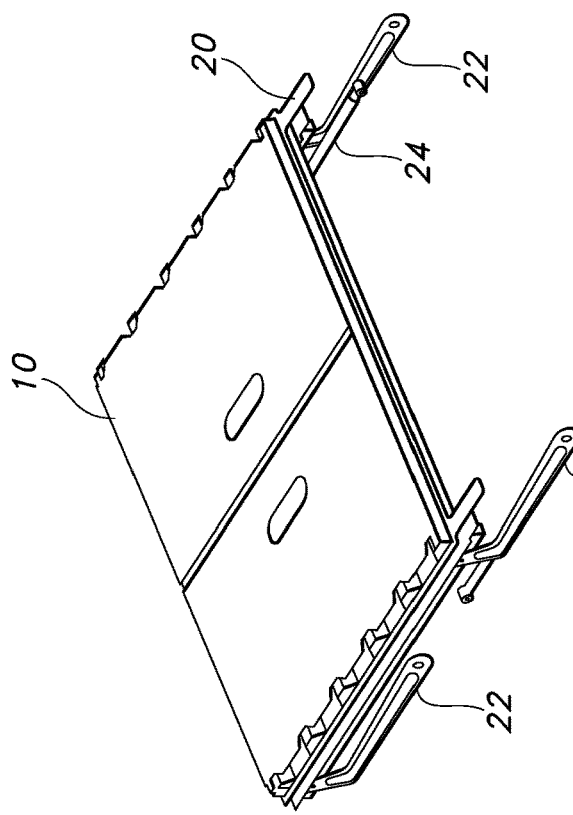

Turning to FIGS. 5-12, the platform 20 may also be adapted for moving to and fro relative to the cargo area or trunk T to facilitate access for removal of the carrier 10 or for article access (placement or removal). Specifically, the platform 20 with the carrier 10 connected thereto and collapsed may move from a forward or stowed (non-deployed) position, as indicated in FIG. 5, to a rearward or deployed position (partial movement indicated in FIG. 6, and the fully deployed position in FIGS. 11 and 12). This movement may also be combined with the raising of the carrier 10 in the vertical direction Y from a lowered position (when non-deployed or non-erected) to a raised position (when deployed or erected). In the illustrated embodiment, this is achieved by providing legs 22 mounted for pivoting movement as the platform 20 is urged rearwardly in the direction of travel D.

One or more of the legs 22, such as the two rearward legs in the illustrated embodiment, may be associated with retainers (such as linear dampers 24) for assisting in retaining the platform 20 in the erected position. The retainers or dampers 24 may be mounted for pivoting relative to the vehicle V at one end, and to the corresponding leg 22 at the other. The damping force provided may be such that it is easily overcome with manual pulling of the platform 20 or carrier 10 in the rearward direction, yet sufficient to prevent return in the forward direction without urging by the user.

Figure 10:
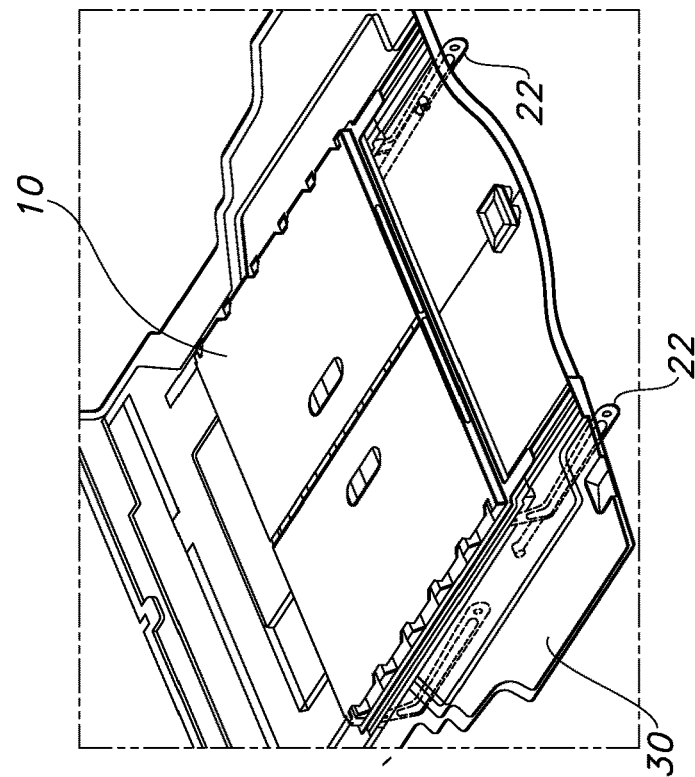
FIGS. 9 and 10 are perspective views showing the positioning of the carrier and support when stowed.
Figure 9:
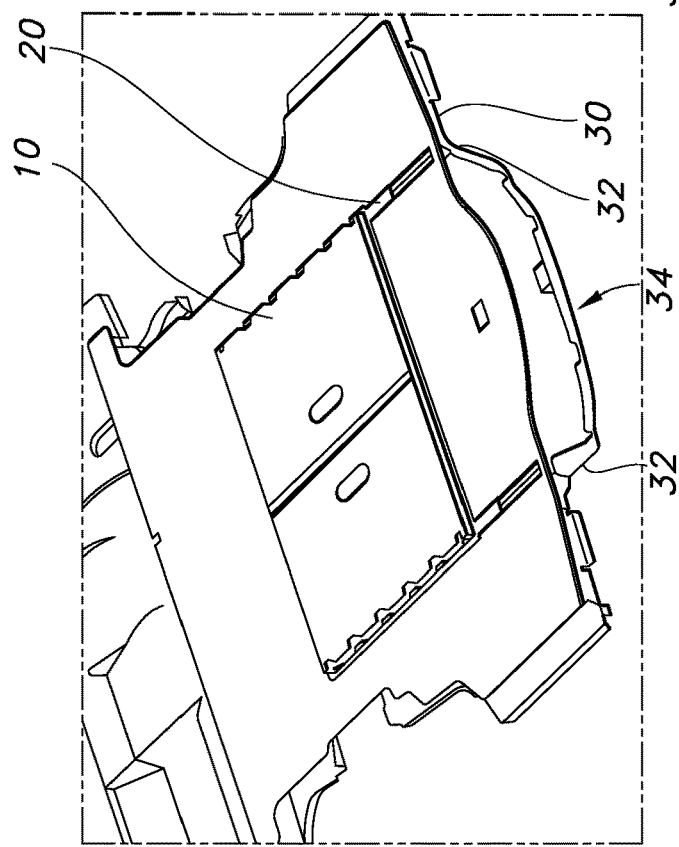

When stowed, the carrier 10 and platform 20 may also be associated with or recessed into the floor 30 of the vehicle cargo area or trunk T. As indicated in FIGS. 9 and 10, the floor 30 may comprise spaced slots or channels 32 that allow for the movement of the legs 22 between the non-erected or stowed condition level with or below the plane of the floor F (such as in a compartment 34) and the erected condition. In this manner, the carrier 10 and platform 20 thus create minimal or no interference with the cargo area.

The platform 20 may also be adapted for moving to and fro relative to the legs 22. For instance, as indicated in FIG. 8a, each pair of legs 22 may be pivotally connected to a channel 26 having an extendable portion 26a. The extendable portion 26a may be connected to the platform 20 such that it may be moved rearwardly in a linear fashion once raised above the floor 30 to the deployed or erected position.

Of course, returning the carrier 10 simply requires pushing on it to return the portion 26a to the nested condition in the channel 26.

Figure 12:
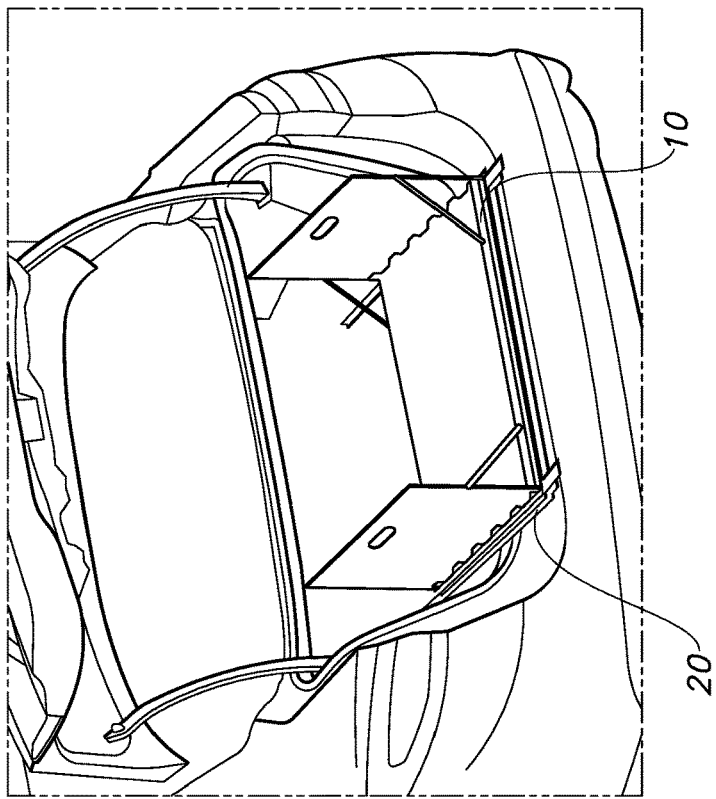
FIGS. 11 and 12 are perspective views showing the sequence of partly removing the carrier from the cargo storage area of the vehicle and then erecting it.
Figure 11:
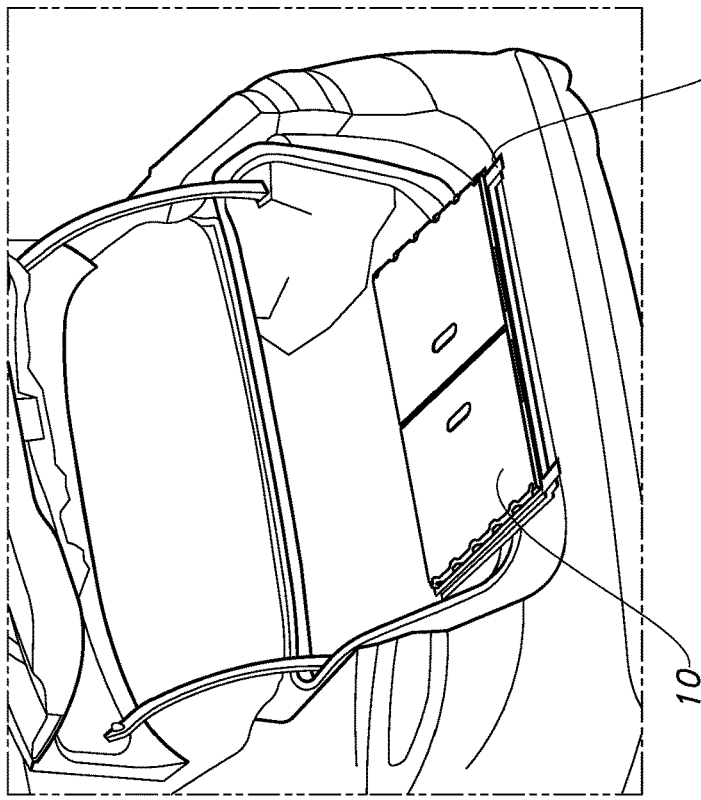
Figure 13:
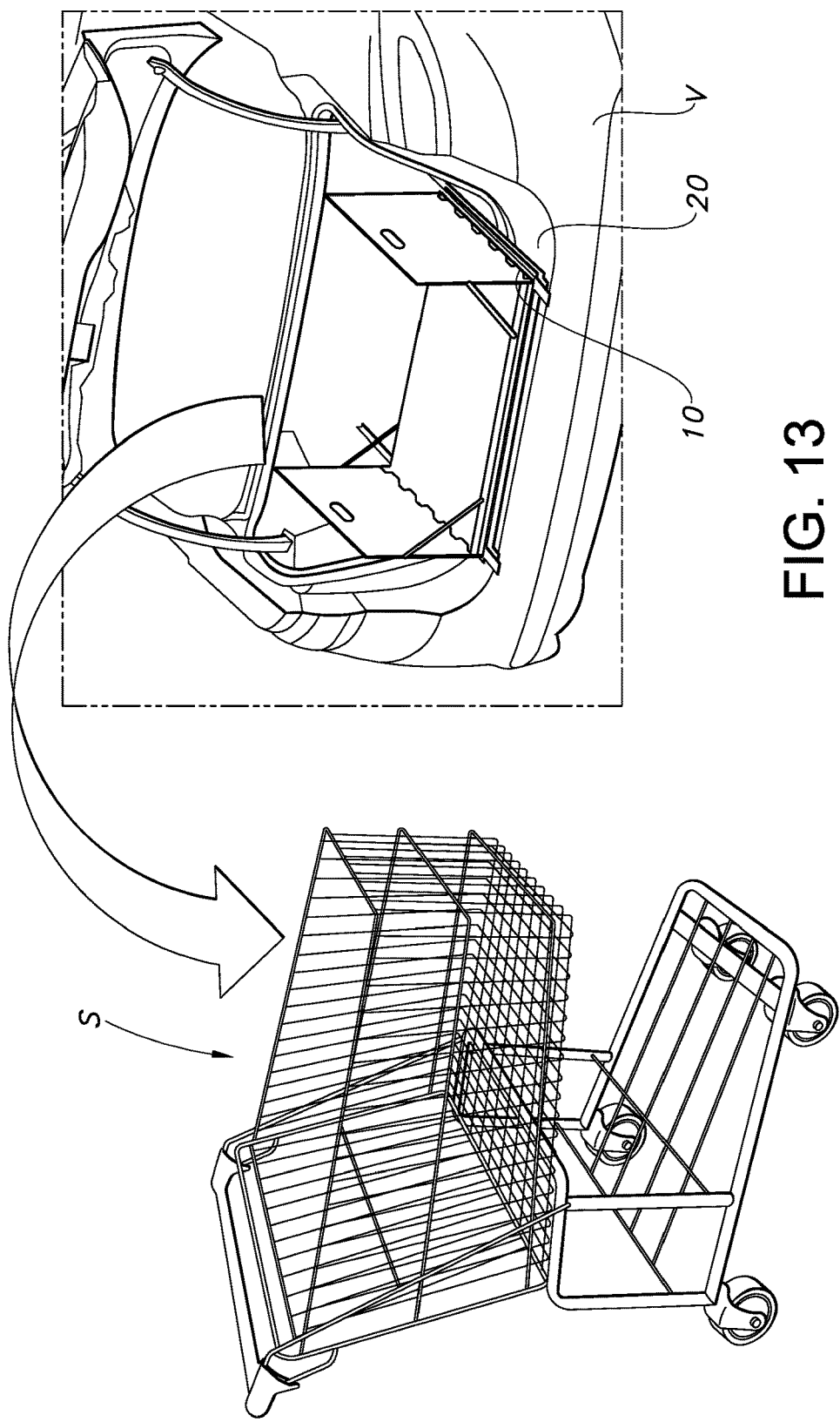
FIG. 13 illustrates the possible removal of the carrier from the vehicle and placement in a shopping cart.

Once the platform 20 is erected, the carrier 10 is moved from being fully contained within the cargo area or trunk T, as shown in FIG. 5, to a position at least partly outside of it, as indicated in FIG. 11, including by way of sliding movement as a result of the extension of portions 26a. The sidewalls 12a, 12b of the carrier 10 may then be raised, as indicated in FIG. 12, to fully erect the carrier 10. The carrier 10 may then be taken to a remote location for placing articles into it, such as using a conventional wheeled shopping cart S, as shown in FIG. 13.

In one possible embodiment, the carrier 10 is sized for positioning within the shopping cart S, such that the groceries or other items may be positioned therein during a shopping event. As can be appreciated, the locator projections (or tabs 10a-10c) may also serve to provide a locating function by passing through the openings in the reticulated floor of the cart S. Thus, security against lateral or forward/rear shifting of the carrier 10 is enhanced as the cart S is wheeled around a shopping location, without compromising removability.

When the cart S is returned to the vehicle V, the carrier 10 can simply be lifted and positioned on the erected platform 20 using the locator feature described above, and the resulting assembly moved into the cargo area or trunk T (with the height of the sidewalls 12a, 12b being such as to avoid interfering with the movement relative to the roof of the trunk). The carrier 10 may then be easily removed for carrying when the desired destination is reached. Once the articles are removed from the compartment C, the carrier 10 may be returned to the collapsed configuration and moved forwardly for storage purposes, thus providing little or no interference with the capacity of the cargo area.

The carrier 10 may be fabricated from lightweight durable materials, such as plastics. In this manner, the carrier 10 does not contribute significantly to the weight of the articles for purposes of carrying. The carrier 10 would also be easy to clean or wipe down in case of a spill.

In summary, a removable article carrier 10 for a vehicle V is proposed. The carrier 10 is collapsible for compact storage in a vehicle cargo area (trunk T or the like) and affords improved locatability to make it easy to remove and replace. A platform 20 is also adapted for being moved rearwardly in the vehicle travel direction to present the collapsible carrier 10 to the user for easy removal and return to the cargo area. An improved arrangement for holding articles for transport thus results in a manner that promotes ease of use and efficiency.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. An apparatus for receiving articles in a vehicle cargo area, comprising:
   a carrier including at least one locator projection; and
   a support for supporting the carrier, the support including a receiver for receiving the locator projection of the carrier to restrict movement of the carrier in a lateral or travel direction while allowing free separation of the carrier from the support for removal from the vehicle cargo area;
   wherein the carrier includes a plurality of locator projections, and the support includes a receiver for receiving the plurality of locator projections.

2. The apparatus of claim 1, wherein the carrier comprises a base and at least two collapsible sidewalls supported by the base.

3. The apparatus of claim 2, further including one or more flexible barriers connecting the at least two collapsible sidewalls.

4. The apparatus of claim 2, wherein the support comprises a platform for supporting the base of the carrier, the platform adapted for sliding from a non-deployed position in the vehicle cargo area to a deployed position at least partially outside the vehicle cargo area.

5. The apparatus of claim 4, wherein the platform is adapted for moving from a non-erect position in the vehicle cargo area to an erect position rearward of the non-erect position.

6. The apparatus of claim 5, further including legs mounted for pivoting movement relative to the support.

7. The apparatus of claim 5, further including a retainer for retaining the support in the erect position.

8. The apparatus of claim 1, wherein the locator projection comprises a tab depending from the carrier, and the receiver comprises an opening for receiving the tab.

9. A vehicle including the apparatus of claim 1.

10. An apparatus for receiving articles in a vehicle cargo area, comprising:
    a collapsible carrier for positioning in the vehicle cargo area for receiving the articles; and
    a platform for supporting the carrier, the platform adapted for raising from a non-erect position in the vehicle cargo area to an erect position rearward of the non-erect position to facilitate accessing any articles in the carrier;
    wherein the carrier includes a plurality of locator projections and the platform includes a receiver for receiving the locator projection to restrict movement of the carrier laterally while allowing the carrier to be separated from the support for removal from the vehicle cargo area.

11. The apparatus of claim 10, further including legs mounted for pivoting movement relative to the platform for supporting the carrier.

12. The apparatus of claim 10, further including a retainer for retaining the platform in the erect position.

13. The apparatus of claim 10, wherein the collapsible carrier comprises a base and at least two sidewalls adapted for collapsing onto the base.

14. The apparatus of claim 13, further including one or more flexible barriers connecting the at least two sidewalls.

15. The apparatus of claim 10, wherein the locator projections each comprise a tab depending from the carrier, and the receiver comprises an opening in the support for receiving the tabs.

16. A vehicle including the apparatus of claim 10.

17. An apparatus for receiving articles in a vehicle cargo area, comprising:
    a collapsible carrier including at least one locator projection; and
    a platform for supporting the carrier, the platform including a receiver for receiving the at least one locator projection to restrict movement of the carrier in a lateral direction and a vehicle travel direction while allowing for free separation of the carrier from the platform for removal from the vehicle cargo area, the platform adapted for raising when moved from a non-erect position in the vehicle cargo area to an erect position rearward of the non-erect position to facilitate accessing articles in the carrier.

18. A method of carrying articles using the carrier of claim 1, comprising separating the carrier from the support and positioning the carrier in a shopping cart.

\* \* \* \* \*